United States Patent [19]
Asano et al.

[11] Patent Number: 6,061,311
[45] Date of Patent: May 9, 2000

[54] RECORDED DATA REPRODUCING APPARATUS WITH SYNCH-BYTE DETECTION

[75] Inventors: Shigetaka Asano; Masaru Sawada, both of Kasugai, Japan

[73] Assignee: Fujitsu Limited, Kawasaki, Japan

[21] Appl. No.: 08/991,878

[22] Filed: Dec. 16, 1997

[30] Foreign Application Priority Data

Apr. 18, 1997 [JP] Japan ..................................... 9-101369

[51] Int. Cl.$^7$ ...................................................... G11B 5/09

[52] U.S. Cl. .................................. 369/47; 369/59; 369/48

[58] Field of Search ................................ 369/59, 47, 124, 369/54, 48

[56] References Cited

U.S. PATENT DOCUMENTS 5,592,458  1/1997  Kobunaya ................................. 369/59

Primary Examiner—Thang V. Tran
Attorney, Agent, or Firm—Staas & Halsey, LLP

[57] ABSTRACT

A device for reproducing data recorded on a recording medium, such as a magnetic disk or an optical disk, includes a data reading apparatus and a data reproducing apparatus. The data reading apparatus reads sector data from the reading medium, including data, synch-byte signals and control signals, and generates a clock signal. The data reading apparatus reproduces the recorded data in accordance with the clock signal. When a synch-byte signal is detected by the reading apparatus, transmission of control signals to the reproducing apparatus is inhibited. In addition, lost data is recovered using other data and an ECC code.

28 Claims, 6 Drawing Sheets

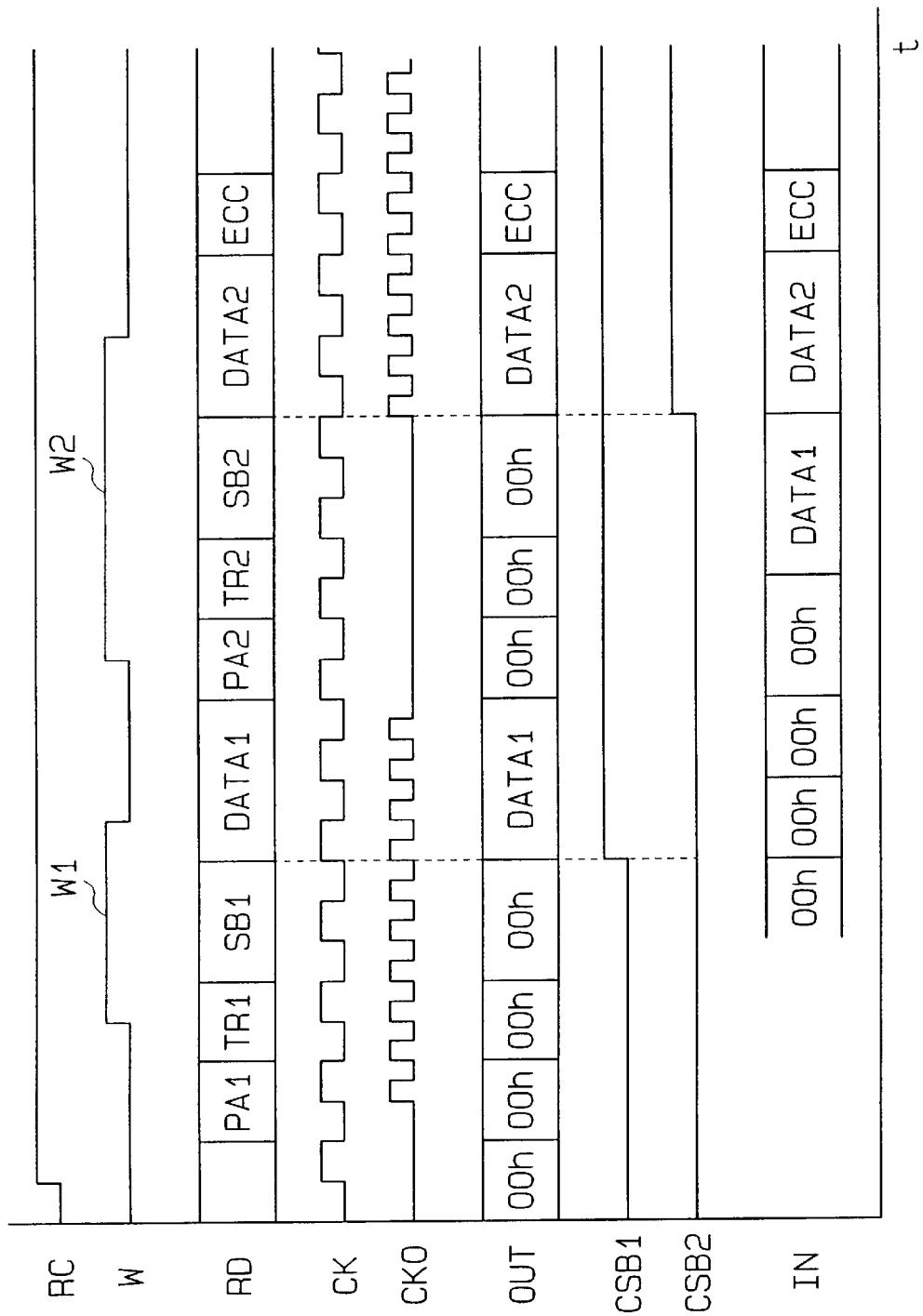

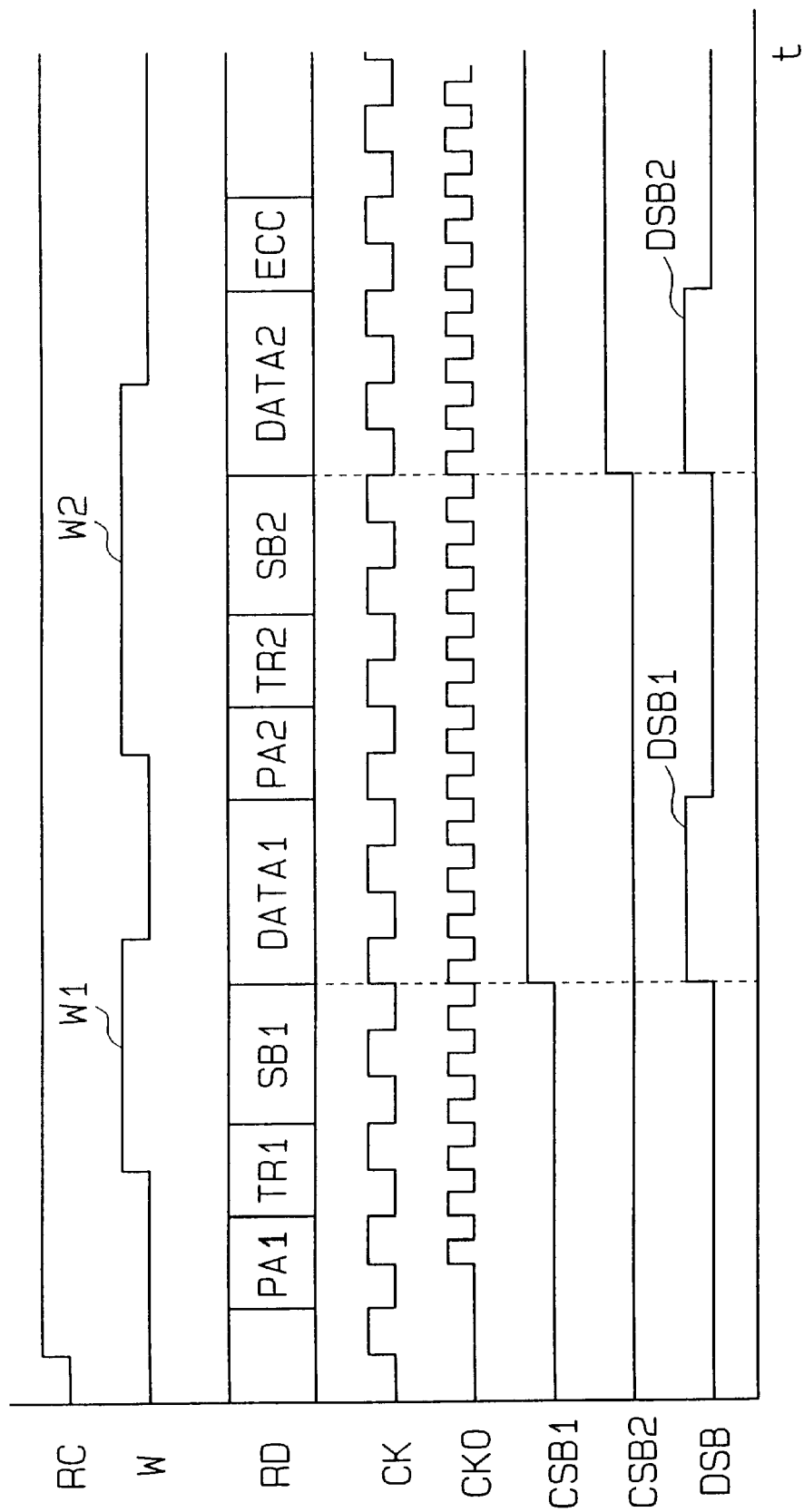

RECORDED DATA REPRODUCING APPARATUS WITH SYNCH-BYTE DETECTION

BACKGROUND OF THE INVENTION

The present invention relates to a method and apparatus for reading data from a recording medium to reproduce original data from the thus-read data at high speed.

Recorded data are read from a hard disk, such as a magnetic disk, an optical disk, or a Digital Video disk (DVD) by means of a read head and are in the form of an analog read signal. The analog read signal is converted into a digital signal by an A/D converter incorporated in a read channel IC, and the digital signal is subjected to various types of digital processing. The thus-processed signal is output to a data reproduction section composed of a DSP, a microcomputer, or the like. The data reproduction section reproduces the original recorded data read from the disk. In recent years, in order to speed up the reproduction of the recorded data, attempts have been made to improve a recording density of the recording medium and a rate at which a digital signal is processed. Accordingly, in order to speed up the digital processing rate, a high-speed interface between the read channel IC and the data reproduction is required.

In the prior art, an analog signal read from a hard disk via a read head is input to a read channel IC. In the read channel IC, the input analog signal is converted into a digital signal by an A/D converter, and the digital signal is subjected to predetermined demodulation processing. The digital signal is converted from a serial signal into a parallel signal comprising a given number of bits and is output to a data reproduction section, i.e., a DSP, a microcomputer, or the like.

In order to cope with an increase in the speed of reproduction of recorded data in recent years, the manner of recording data on a hard disk has been modified such that a plurality of synch-bytes (synchronization bytes) are stored in each sector, and for each synch-byte, record data, a preamble signal, and a training signal are stored, along with an ECC (error checking and correcting) code, in each sector.

The synch-byte is provided for synchronizing an operation for reading each piece of recorded data, and the preamble signal and the training signal include signals for setting coefficients of a filter and an amplifier incorporated in the read channel IC, or a ratio of frequency division of a PLL (Phase Locked Loop) circuit.

The read channel IC subjects these signals and the recorded data, both of which are read from each sector, to predetermined processing and outputs the thus-processed signal and data to the data reproduction section. Further, the read channel IC outputs a synch-byte detection signal-which indicates whether or not each synch-byte has been correctly read-to the data reproduction section.

The data reproduction section reproduces original data from the recorded data received from the read channel IC. At this time, so long as the synch-byte detection signal indicates that at least one synch-byte in each sector has been correctly read, even if the other synch-bytes are not correctly read, original data corresponding to the other synch-bytes can be reproduced on the basis of the recorded data corresponding to the correctly-read synch-byte and the ECC code.

In the foregoing recorded data reproduction apparatus, the preamble signal and the training signal are input to the data reproduction section along with the recorded data and the synch-byte output from the read channel IC. The correctly-read recorded data are extracted from the recorded data and the signals on the basis of the synch-byte detection signal, and the original data are reproduced from the recorded data.

As described above, since the operation for extracting the recorded data on the basis of the synch-byte detection signal and the operation for reproducing the original data from the thus-detected recorded data are both executed by the data reproduction section, a data reproduction section employing a slow-speed DSP or microcomputer cannot reproduce the original data from the recorded data which are read while a recent high-recording-density hard disk is rotated at high speed. As a result, in order to increase the data reproduction rate, a high-speed DSP or microcomputer must be used as the data reproduction section, which increases the cost of the recorded data reproduction apparatus. Accordingly, it would be advantageous to provide a method and an apparatus for reproducing recorded data to enable high-speed data reproduction while preventing an increase of cost.

SUMMARY OF THE INVENTION

Briefly stated, the present invention provides a method for reproducing original data from sector data recorded on a recording medium. The sector data includes plural pieces of recorded data, synch-byte signals, and control signals. Each of the synch-byte and control signals corresponds to one of the plural pieces of recorded data, respectively, and each control signal is used for a read control. The method includes the steps of: reading the sector data from the recording medium using a data reading apparatus; detecting the synch-byte signals the sector data; providing the control signals to a data reproducing apparatus; interrupting the providing of a control signal to the data reproducing apparatus when a synch-byte signal is detected, wherein the control signal corresponds to one of the plural pieces of recorded data read after the synch-byte signal is detected; providing the plural pieces of recorded data from the data reading apparatus to the data reproducing apparatus; and reproducing original data from plural pieces of recorded data using the data reproducing apparatus.

The present invention also provides a method for reproducing original data from sector data recorded on a recording medium. The sector data includes plural pieces of recorded data, synch-byte signals, and control signals. Each of the synch-byte and control signals corresponds to one of the plural pieces of recorded data, respectively, and each control signal is used for a read control. The method includes the steps of: reading the sector data from the recording medium using a data reading apparatus; generating the clock signals using an internal clock generator of the data reading apparatus; providing the clock signals to a data reproducing apparatus; detecting the synch-byte signals of the sector data; interrupting the providing of the clock signals to the data reproducing apparatus based on the detection of a synch-byte signal, wherein the clock signals are interrupted from a time of completion of reading a primary piece of recorded data to a time of commencement of reading a secondary piece of recorded data; providing the plural pieces of recorded data, with the clock signals, from the data reading apparatus to the data reproducing apparatus; and reproducing, in accordance with the clock signals, original data from the plural pieces of recorded data using the data reproducing apparatus.

The present invention provides a method for reproducing original data from sector data recorded on a recording medium. The sector data includes plural pieces of recorded data, synch-byte signals, control signals, and an ECC code signal. Each of the synch-byte and control signals corresponds to one of the plural pieces of recorded data, respectively, and each control signal is used for a read control. The method includes the steps of: reading the sector data from the recording medium using a data reading apparatus; generating the clock signals using the data reading apparatus; providing the clock signals to a data reproducing apparatus; detecting the synch-byte signals of the sector data; interrupting the providing of the clock signals from the data reading apparatus to the data reproducing apparatus based on the detection of a synch-byte signal, wherein the control signals is interrupted from a time of completion of reading a primary piece of recorded data to a time of commencement of reading a secondary piece of recorded data; providing the plural pieces of recorded data, with the clock signals, from the data reading apparatus to the data reproducing apparatus; reproducing, in accordance with the clock signals, original data from the plural pieces of recorded data using the data reproducing apparatus; and wherein when any one of the synch-byte signals is not detected in the detecting step; and restoring the original data corresponding to the undetected synch-byte signal from the recorded data corresponding to another synch-byte signal and the ECC code signal.

The intention also provides an apparatus for reproducing original data from sector data recorded on a recording medium. The sector data includes plural pieces of recorded data, synch-byte signals, and control signals. Each of the synch-byte and control signals corresponds to one of the plural pieces of recorded data, respectively, and each control signal is used for a read control. The apparatus includes a data reading apparatus for reading the sector data from the recording medium, generating clock signals, and detecting the synch-byte signals of the sector data; and a data reproducing apparatus for receiving the plural pieces of recorded data and the clock signals from the data reading apparatus, and for reproducing, in accordance with the clock signals, original data from the plural pieces of recorded data. The data reading apparatus interrupts the providing of the clock signals to the data reproducing apparatus based on the detection of a synch-byte signal, the clock signals being interrupted from a time of completion of reading a primary piece of the recorded data to a time of commencement of reading a secondary piece of the recorded data.

The present invention provides an apparatus for reproducing original data from sector data recorded on a recording medium. The sector data includes plural pieces of recorded data, synch-byte signals, control signals, and an ECC code signal. Each of the synch-byte and control signals corresponds to one of the plural pieces of recorded data, respectively, and each control signal is used for a read control. The apparatus includes a data reading apparatus for reading the sector data from the recording medium, generating clock signals, and detecting the synch-byte signals of the sector data; and a data reproducing apparatus for receiving plural pieces of recorded data and the clock signals from the data reading apparatus, and for reproducing, in accordance with the clock signals, original data from the plural pieces of recorded data of the sector data. The data reading apparatus interrupts the providing of the clock signals to the data reproducing apparatus based on the detection of a synch-byte signal, the clock signals being interrupted from a time of completion of reading a primary piece of the recorded data to a time of commencement of reading a secondary piece of the recorded data, and wherein when any one of the synch-byte signals is not detected, the data reading apparatus restores the original data corresponding to the undetected synch-byte signal from the recorded data corresponding to another synch-byte signal and the ECC code signal.

The invention provides an apparatus for reproducing data from sector data recorded on a recording medium. The sector data includes plural pieces of original data, synch-byte signals, and control signals. Each of the synch-byte signals and control signals corresponds with a respective one of the plural pieces of original data. The apparatus includes: an analog to digital converter circuit for receiving sector data read from the recording medium and converting the read sector data from an analog signal to a serial digital circuit; a clock generator for generating an internal clock signal; a synch-byte detector which receives the serial digital signal and detects a synch-byte signal therein; a data reproduction device coupled to the clock generator and the synch-byte detector, the data reproduction device for receiving the serial digital signal and the clock signal and reproducing the plural pieces of original data from the serial digital signal in accordance with the clock signal. The clock signal is inhibited by the synch-byte detector when a synch-byte is detected.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings, in which;

FIGS. 2 to 6 are timing charts showing the operation of the recorded data reproduction apparatus of the FIG. 1.

DETAILED DESCRIPTION OF THE PREFERRED EMBODIMENT

Figure 1:
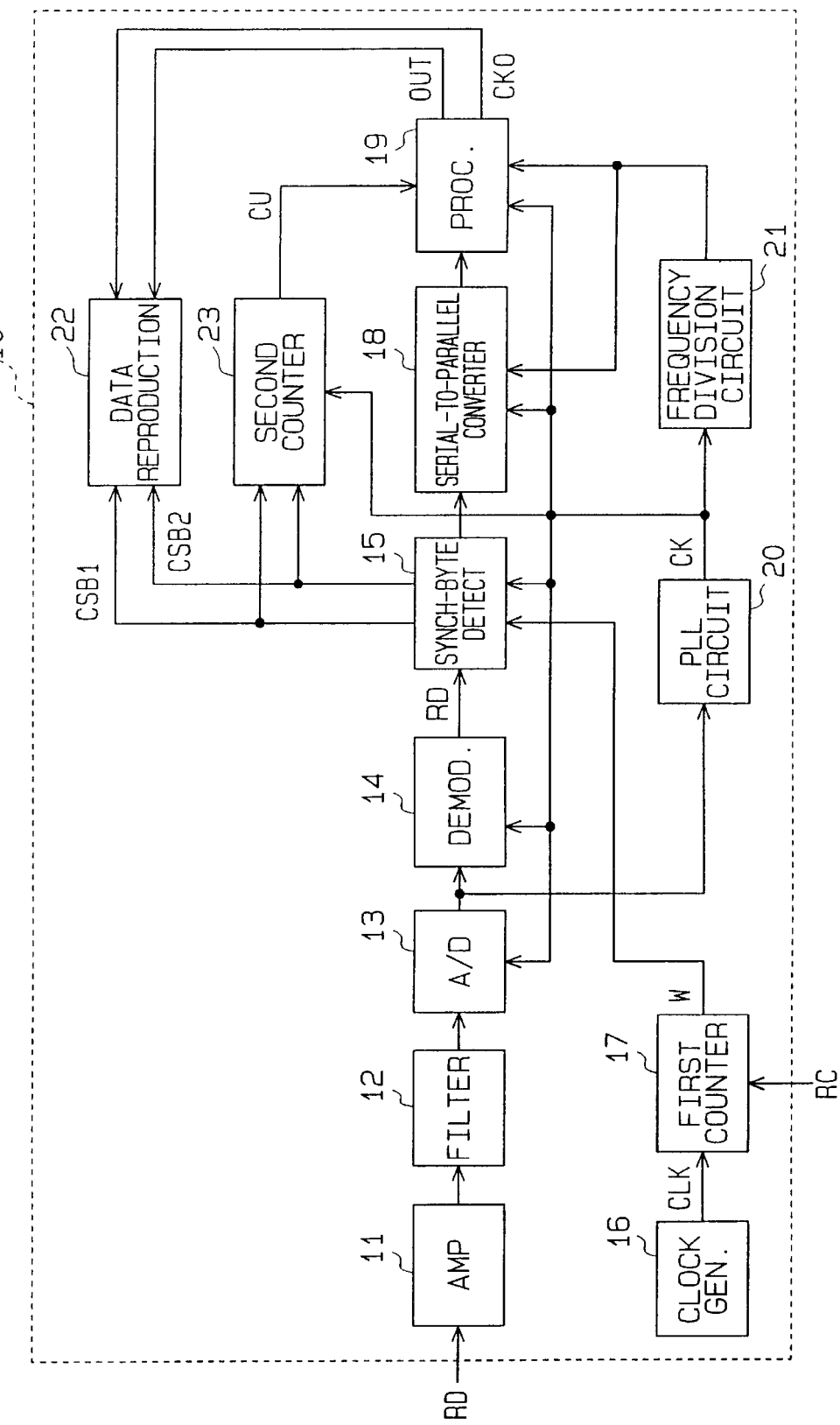
FIG. 1 is a block diagram illustrating a recorded data reproduction apparatus in accordance with an embodiment of the present invention.

FIG. 1 is a block diagram of one embodiment of a recorded data reproduction apparatus embodying the present invention. The recorded data reproduction apparatus is incorporated in a read channel IC 10. The read channel IC includes a gain controllable amplifier 11, analog equalizer filter 12, A/D converter 13, a demodulator 14, a synch-byte detection section 15, an internal clock generator 16, a first counter section 17, a serial-to-parallel converter 18, a data processing section 19, a PLL circuit 20, a frequency division circuit 21, a data reproduction section 22 and a second counter section 23. The circuits 11 to 21 and 23 form a data reading apparatus. The data reproduction section 22 forms a data reproducing apparatus.

A read signal RD is read from a hard disk in the form of an analog signal by a read head (not shown). The read signal RD is input to the gain controllable amplifier 11 of the read channel IC 10. The gain controllable amplifier 11 amplifies the read signal RD to a given amplitude and outputs an amplified signal to the analog equalizer filter 12.

From the amplified signal output from the gain controllable amplifier 11, the analog equalizer filter 12 selects only a signal having frequencies within a predetermined range, and outputs a filtered signal to the A/D converter 13.

The A/D converter 13 converts the filtered signal output from the analog equalizer filter 12 into a digital signal and outputs the digital signal to the demodulation circuit 14. The demodulation circuit 14 demodulates the input digital signal according to, e.g., a maximum likelihood demodulation method, and outputs the a demodulated signal to the synch-byte detection section 15.

Figure 2:
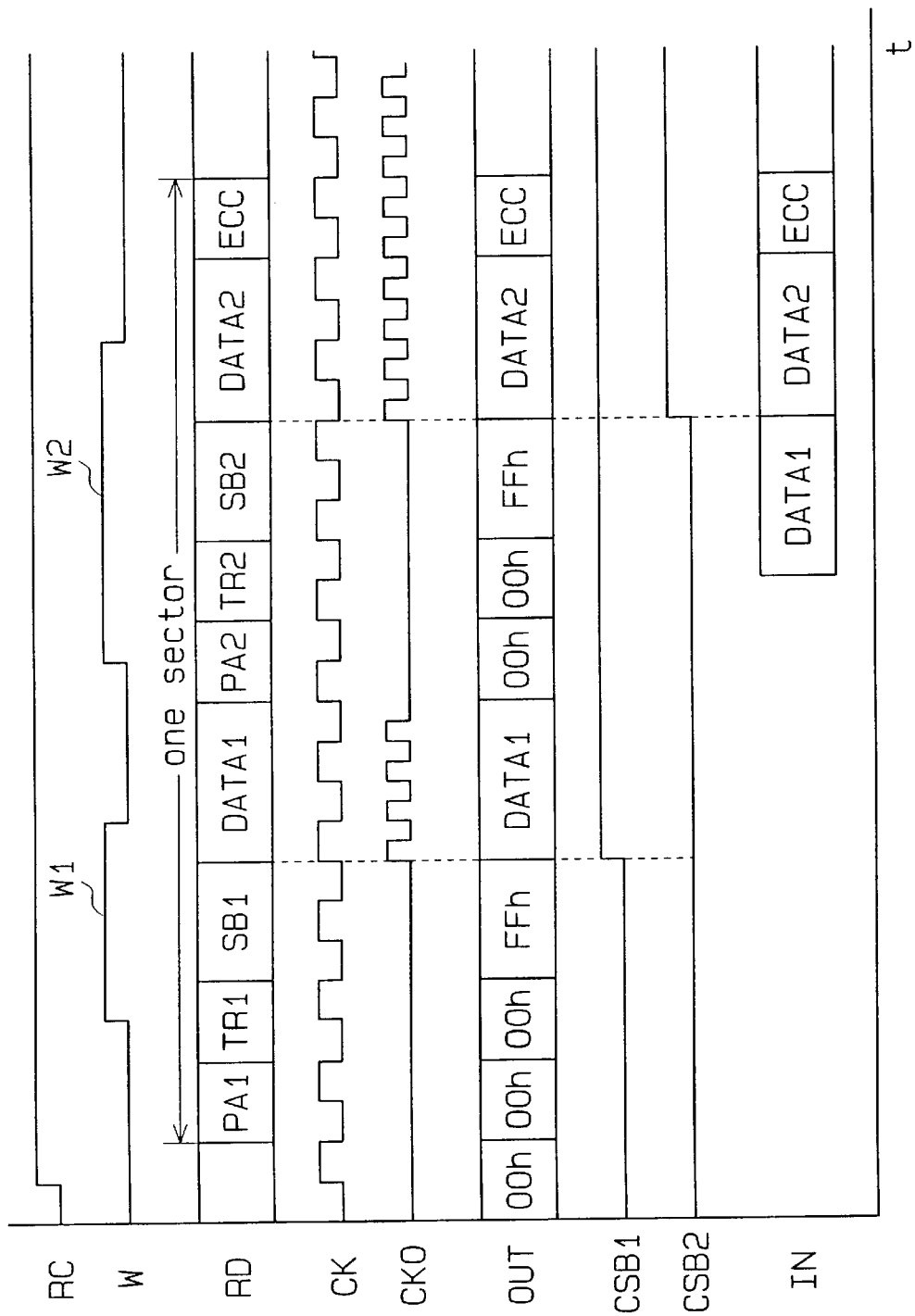

Referring now to FIG. 2, the read signal RD of each sector of a disk includes two preamble signals PA1, PA2; two training signals TR1, TR2; two synch-byte signals SB1, SB2; two recorded data DATA 1, DATA 2; and an ECC code. Prior to the output of the recorded data DATA 1, the preamble signal PA1, the training signal TR1, and the synch-byte signal SB1 are read, in this sequence. Further, prior to the output of the recorded data DATA 2, the preamble signal PA2, the training signal TR2, and the synch-byte signal SB2 are read, in this sequence, and lastly the ECC code is read. The ECC code is an error correction code for enabling restoration of either the recorded data DATA 1 or the recorded data DATA 2 on the basis of a remaining one of these sets of recorded data.

The internal clock generator 16 generates a reference clock signal CLK having a predetermined frequency and outputs the clock signal CLK to the first counter section 17. A read instruction signal RC is input to the first counter section 17 from an external control circuit (not shown). For example, as shown in FIG. 2, the first counter section 17 outputs a window signal W to the synch-byte detection section 15. The window signal W goes high for a given period of time in each sector by counting the reference clock signal CLK in response to the received read instruction signal RC.

As shown FIG. 2, upon detection of the synch-byte signal SB1 by the synch-byte detection section 15, during the input of the window signal w1, the synch-byte detection section 15 outputs to the data reproduction section 22 and the second counter section 23 a first synch-byte detection signal CSB1 having high level. Upon detection of the synch-byte signal SB2 by the synch-byte detection section 15, during the input of the window signal W2, the synch-byte detection section 15 outputs to the data reproduction section 22 and the second counter section 23, a second synch-byte detection signal CSB2 having high level.

The demodulated signal output from the demodulation circuit 14 is input to the serial-to-parallel converter 18 by way of the synch-byte detection section 15. The serial-to-parallel converter 18 receives the demodulated signal in the form of a serial signal and converts it to a parallel signal comprising a given number of bits. The parallel signal is output from the converter 18 to the data processing section 19.

The digital signal output from the A/D converter 13 is also input to the PLL circuit 20. The PLL circuit 20 generates an internal clock signal CK having a frequency in synchronization with the digital signal output from the A/D converter 13 and outputs the clock signal CK to the A/D converter 13, the demodulator 14, the synch-byte detection section 15, the serial-to-parallel converter 18, the data processing section 19, the frequency division circuit 21, and the second counter section 23. The circuits 13–15, 18, 19 and 21 operate in synchronization with the internal clock signal CK.

Upon receipt of the internal clock signal CK, the frequency division circuit 21 divides the internal clock signal CK at a predetermined frequency division ratio and outputs the frequency divided signal to the serial-to-parallel converter 18 and the data processing section 19.

In synchronization with the internal clock signal CK, the data processing section 19 outputs the parallel signal received from the serial-to-parallel converter 18 to the data reproduction section 22 as an output signal OUT. Further, on the basis of the frequency division signal received from the frequency division circuit 21 and in synchronization with the output signal OUT, the data processing section 19 outputs to the data reproduction section 22 an output clock signal CKO. The clock signal CKO will be discussed in greater detail below, with reference to FIGS. 2–6.

The data reproduction section 22 is a data reproduction apparatus, including a digital signal processor (DSP) or a microprocessor (not shown).

Figure 3:
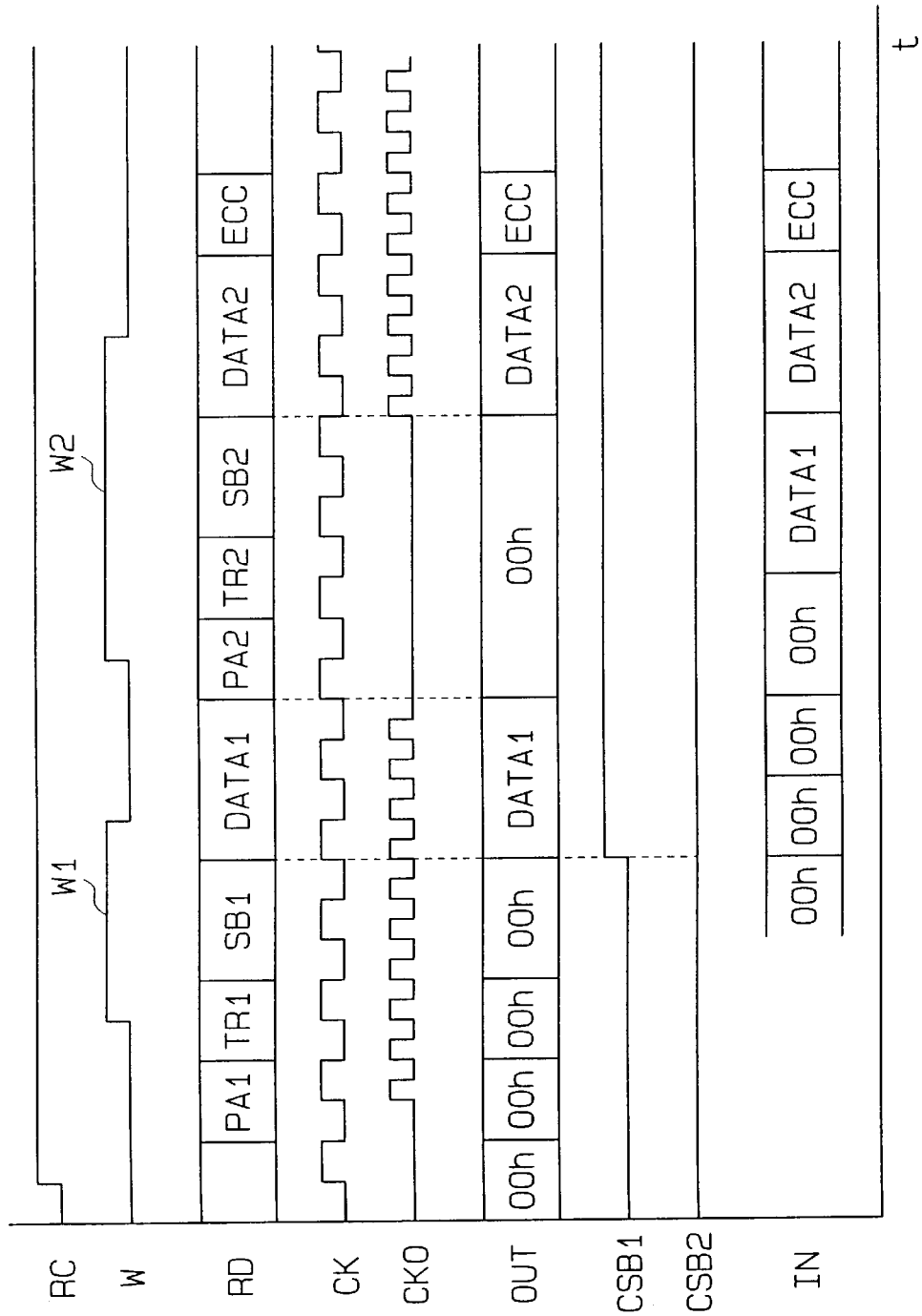

Referring now to FIG. 3, the output signal OUT becomes, for example, "00h", i.e., all 0s, when the read signal RD is the preamble signals PA1, PA2, the training signals TR1, TR2, or the synch-byte signals SB1, SB2. The data processing section 19 may be modified such that the output signal OUT becomes "FFh", i.e., all 1s, when the read signal RD is the synch-byte signals SB1, SB2.

Upon correct receipt of the synch-bytes SB1, SB2, the data processing section 19 outputs the corresponding recorded data DATA 1, DATA 2 in accordance with the preamble signals PA1, PA2 and the training signals TR1, TR2 corresponding to the synch-byte signals SB1, SB2. The recorded data DATA 1, DATA 2 are output directly, without modification, from the data processing section 19 to the data reproduction section 22. However, if the synch-byte signals SB1, SB2 are incorrectly received, the data processing section 19 becomes unable to output the corresponding recorded data DATA 1 and DATA 2. The synch-byte signals SB1, SB2 are output to the second counter section 23, and the second counter section 23 commences counting of the internal clock signal CK in response to the synch-byte signals SB1, SB2 and outputs a predetermined count-up signal CU to the data processing section 19.

The operation of the recorded data reproduction apparatus having the foregoing configuration will now be described.

As shown in FIG. 2, when the read instruction signal RC is input to the first counter section 17, the first counter section 17 commences a counting operation and sequentially outputs the window signals W1, W2 to the synch-byte detection section 15.

The read signal RD is input to the gain controllable amplifier 11 and subjected to predetermined processing by the analog equalizer filter 12, the A/D converter 13, the demodulation circuit 14, the synch-byte detection section 15, and the serial-to-parallel converter circuit 18. The thus-processed read signal RD is then output to the data processing section 19.

The data processing section 19 outputs "00h," when the processed read signal is neither the recorded data DATA 1 nor the recorded data DATA 2.

Upon detection of the synch-byte signal SB1 by the synch-byte detection section 15, while the received window signal W1 is high, the synch-byte detection section 15 outputs the synch-byte detection signal CSB1, which goes high at the same time the detection of the synch-byte signal SB1 is completed.

In response to the synch-byte detection signal CSB1, the second counter section 23 commences counting of the internal clock signal CK and outputs to the data processing section 19 a first count-up signal CU in synchronization with the completion of output (OUT) of the recorded data DATA 1 from the data processing section 19. In response to the first count-up signal CU, the data processing section 19 suspends the output of the output clock signal CKO.

Subsequently, upon detection of the synch-byte signal SB2 from the read signal RD, while the received window signal W2 is high, the synch-byte detection section 15 outputs the synch-byte detection signal CSB2, which goes high at the same time the detection of the synch-byte signal SB2 is completed.

When the data processing section 19 commences the output (OUT) of the recorded data DATA 2, the second counter section 23 outputs a second count-up signal CU to the data processing section 19. In response to the second count-up signal CU, the data processing section 19 resumes the output of the output clock signal CKO.

As a result of the foregoing operations, when the output clock signal CKO is not received from the data processing section 19, the data reproduction section 22 does not receive the output signal OUT from the data processing section 19. Consequently, subsequent to the recorded data DATA 1, the recorded data DATA 2 and the ECC code are input to the data reproduction section 22 as an input signal IN (see FIG. 2). In this manner, only data signals required for reproduction are input to the data reproduction section 22 and unwanted signals corresponding to the preamble signal PA2, the training signal TR2, and the synch-byte signal SB2 are not input to the data reproduction section 22. Accordingly, the arithmetic processing performed by the data reproduction section 22 is reduced.

FIG. 3 shows a case where the synch-byte detection section 15 cannot detect the synch-byte signal SB2. If the synch-byte detection section 15 cannot detect the synch-byte signal SB2 from the processed read signal RD while the received window signal W2 is high, the synch-byte detection signal CSB2 is not output.

Even in this case, in response to the first and second count-up signals CU, the data processing section 19 suspends the output of the output clock signal CKO from completion of output of the recorded data DATA 1 from the data processing section 19 until commencement of the output of the recorded data DATA 2. Following the recorded data DATA 1, the recorded data DATA 2 and the ECC code are input to the data reproduction section 22. Therefore, the data reproduction section 22 does not perform unnecessary processing.

Figure 4:
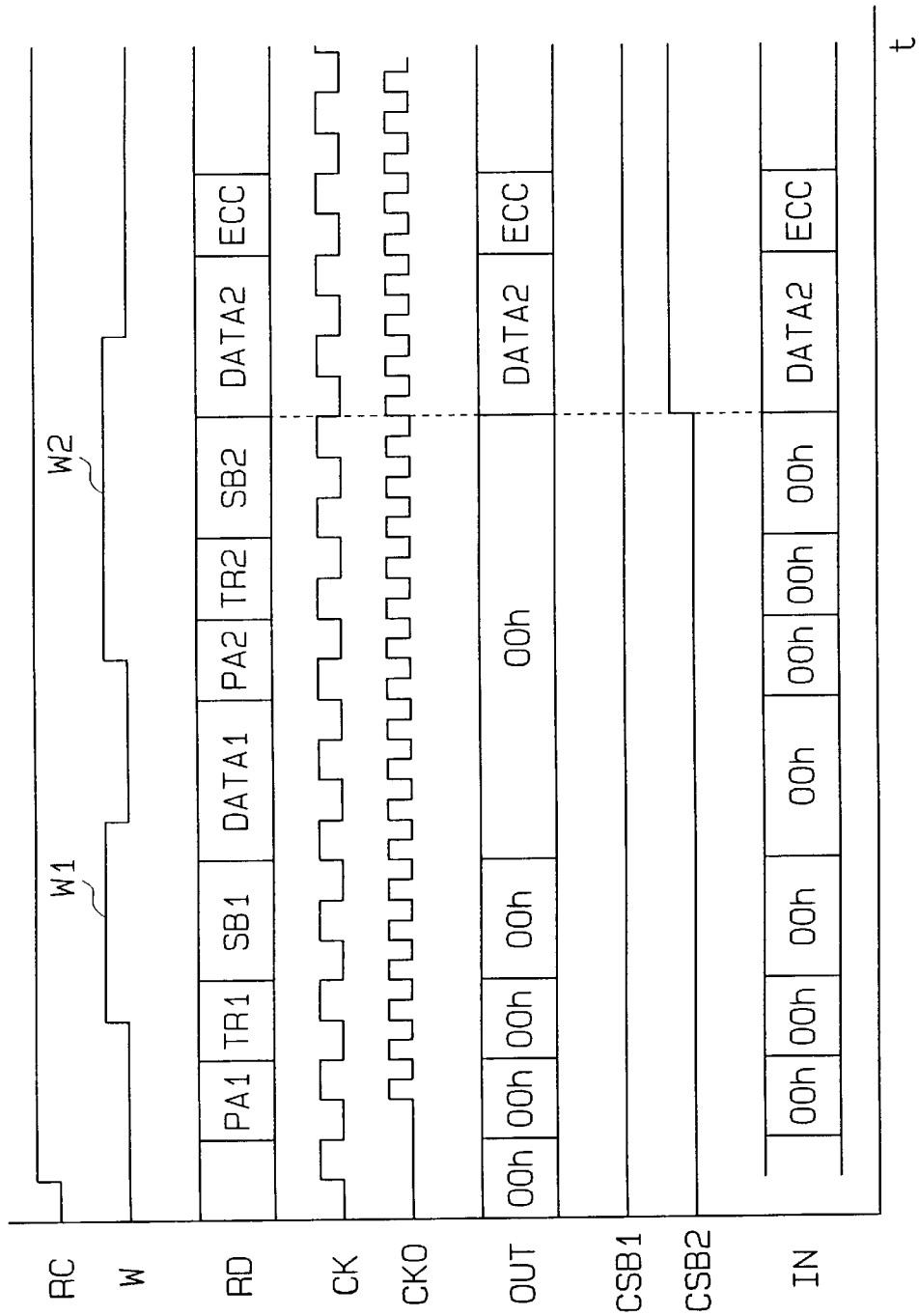

FIG. 4 shows a case where the synch-byte detection section 15 cannot detect the synch-byte signal SB1. If the synch-byte detection section 15 cannot detect the synch-byte signal SB1 while the received window signal W1 is high, the synch-byte detection signal CSB1 is not output.

However, upon detection of the synch-byte signal SB2, while the received window signal W2 is high, the synch-byte detection section 15 outputs the synch-byte detection signal CSB2, which goes high at the same time the detection of the synch-byte signal SB2 is completed. In this case, since there has not been a correct input of the synch-byte signal SB1, the data processing section 19 continues outputting the signal "00h" until the recorded data DATA 2 are received, and then outputs the ECC code after outputting the recorded data DATA 2.

Since the synch-byte detection signal CSB2 alone is input to the data reproduction section 22, the data reproduction section 22 acknowledges that there has been no input of the recorded data DATA 1. The data reproduction section 22 reproduces the original data from the recorded data DATA 1 using the recorded DATA 2 and the ECC code. In order to reproduce the original data from the recorded data DATA 1 at high speed, the amount of the recorded data DATA 1 should be reduced, as compared with the amount of the recorded data DATA 2.

FIG. 5 shows a case where the data processing section 19 outputs the output clock signal CKO only when outputting the recorded data DATA 1 and DATA 2 and the ECC code.

In this case, the second counter section 23 outputs a count start signal to the data processing section 19 in response to an input of the synch-byte detection signal CSB1. Further, the data processing section 19 outputs the output clock signal CKO in response to the counter start signal.

Further, the second counter section 23 is configured to output a count-up signal which is in synchronization with the completion of output of the recorded data DATA 1. The data processing section 19 also suspends the output of the output clock signal CKO in response to the count-up signal.

The second counter section 23 also outputs to the data processing section 19 a count-up signal which is in synchronization with the commencement of output of the recorded data DATA 2 or a count start signal corresponding to the synch-byte detection signal CSB2. The data processing section 19 commences the output of the output clock signal CKO in response to the count-up signal or the count start signal. Further, the data processing section 19 outputs the output clock signal CKO only while the data processing section 19 outputs the recorded data DATA 1, DATA 2 and the ECC code. Accordingly, after the recorded data DATA 1 is input, the recorded data DATA 2 and the ECC code are input to the data reproduction section 22, as the input signal IN. Thus, for this case also, the data reproduction section 22 does not perform unnecessary arithmetic processing.

FIG. 6 shows a case where the data processing section 19 produces descramble signals DSB1 and DSB2, which are used for descrambling the recorded data DATA 1 and DATA 2, in response to the synch-byte detection signals CSB1 and CSB2.

More specifically, in response to the synch-byte detection signal CSB1, the second counter section 23 produces the descramble signal DSB1, which goes high in synchronization with the input of the recorded data DATA 1 into the data processing section 19. The descramble signal DSB1 is output to the data processing section 19. Further, in response to the synch-byte detection signal CSB2, the second counter section 23 produces the descramble signal DSB2, which goes high in synchronization with the input of the recorded data DATA 2 into the data processing section 19. The descramble signal DSB2 is output to the data processing section 19.

On the basis of the descramble signals DSB1, DSB2, the data processing section 19 performs a descrambling operation to reproduce the original data from the recorded data DATA 1, DATA 2 in a predetermined data format.

With the foregoing configuration of the second counter section 23, the descrambling of the recorded data DATA 1 and DATA 2 by the data processing section 19 is controlled by the synch-byte detection signals CSB1, CSB2.

It should be apparent to those skilled in the art that the present invention may be embodied in many other specific forms without departing from the spirit or scope of the invention. Therefore, the present examples and embodiments are to be considered as illustrative and not restrictive and the invention is not to be limited to the details given herein, but may be modified within the scope and equivalence of the appended claims.

What is claimed is:

1. A method for reproducing original data from sector data recorded on a recording medium, the sector data including plural pieces of recorded data, synch-byte signals, and control signals, wherein each of the synch-byte and control signals corresponds to one of the plural pieces of recorded data, respectively, and each control signal is used for a read control, said method comprising the steps of:

reading the sector data from the recording medium using a data reading apparatus;

detecting the synch-byte signals of the sector data;

providing the control signals to a data reproducing apparatus;

interrupting the providing of a control signal to the data reproducing apparatus when a first synch-byte signal is detected, until a second synch-byte signal is detected, wherein the control signal corresponds to one of the plural pieces of recorded data read after the synch-byte signal is detected;

providing the plural pieces of recorded data from the data reading apparatus to the data reproducing apparatus; and reproducing original data from plural pieces of recorded data using the data reproducing apparatus.

2. The method according to claim 1, wherein said interrupting step includes the step of providing a predetermined bit pattern indicative of interruption from the data reading apparatus to the data reproduction apparatus.

3. The method according to claim 2, wherein said predetermined bit pattern comprises a pattern of all 0's.

4. The method according to claim 1, wherein when any one of the synch-byte signals is not detected in the detecting step, said method further comprises the step of restoring the original data corresponding to the undetected synch-byte signal from the recorded data corresponding to another synch-byte signal.

5. The method according to claim 1, wherein said control signals include a preamble signal and a training signal.

6. A method for reproducing original data from sector data recorded on a recording medium, the sector data including plural pieces of recorded data, synch-byte signals, and control signals, wherein each of the synch-byte and control signals corresponds to one of the plural pieces of recorded data, respectively, and each control signal is used for a read control, said method comprising the steps of:

reading the sector data from the recording medium using a data reading apparatus;

generating an output clock signal;

providing the output clock signal to a data reproducing apparatus;

detecting the synch-byte signals of the sector data;

interrupting the providing of the output clock signal to the data reproducing apparatus based on the detection of a first synch-byte signal, wherein the output clock signal is interrupted from a time of completion of reading a first piece of recorded data to a time of commencement of reading a second piece of recorded data, as determined by detection of a second synch-byte signal;

providing the plural pieces of recorded data, with the output clock signal, from the data reading apparatus to the data reproducing apparatus; and reproducing, in accordance with the output clock signal, original data from the plural pieces of recorded data using the data reproducing apparatus.

7. The method according to claim 6, wherein said interrupting step includes the step of providing a predetermined bit pattern indicative of interruption from the data reading apparatus to the data reproduction apparatus.

8. The method according to claim 7, wherein said predetermined bit pattern comprises a pattern of all 0's.

9. The method according to claim 6, wherein when any one of the synch-byte signals is not detected in the detecting step, said method further comprises the step of restoring the original data corresponding to the undetected synch-byte signal from the recorded data corresponding to another synch-byte signal.

10. The method according to claim 7, wherein said control signal includes a preamble signal and a training signal.

11. A method for reproducing original data from sector data recorded on a recording medium, the sector data including plural pieces of recorded data, synch-byte signals, control signals, and an ECC code signal, wherein each of the synch-byte and control signals corresponds to one of the plural pieces of recorded data, respectively, and each control signals is used for a read control, said method comprising the steps of:

reading the sector data from the recording medium using a data reading apparatus;

generating an output clock signal using the data reading apparatus;

providing the output clock signal to a data reproducing apparatus;

detecting the synch-byte signals of the sector data;

interrupting the providing of the output clock signal from the data reading apparatus to the data reproducing apparatus based on the detection of a first synch-byte signal, wherein the output clock signal is interrupted from a time of completion of reading a first piece of recorded data to a time of commencement of reading a second piece of recorded data, as determined by detection of a second synch-byte signal;

providing the plural pieces of recorded data, with the output clock signal, from the data reading apparatus to the data reproducing apparatus;

reproducing, in accordance with the output clock signal, original data from the plural pieces of recorded data using the data reproducing apparatus; and wherein when any one of the synch-byte signals is not detected in the detecting step, restoring the original data corresponding to the undetected synch-byte signal from the recorded data corresponding to another synch-byte signal and the ECC code signal.

12. The method according to claim 11, wherein said interrupting step includes the step of providing a predetermined bit pattern indicative of interruption from the data reading apparatus to the data reproduction apparatus.

13. The method according to claim 12, wherein said predetermined bit pattern comprises a pattern of all 0's.

14. The method according to claim 11, wherein said control signal includes a preamble signal and a training signal.

15. An apparatus for reproducing original data from sector data recorded on a recording medium, the sector data including plural pieces of recorded data, synch-byte signals, and control signals, wherein each of the synch-byte and control signals corresponds to one of the plural pieces of recorded data, respectively, and each control signal is used for a read control, said apparatus comprising:

a data reading apparatus for reading the sector data from the recording medium, generating clock signals, and detecting the synch-byte signals of the sector data; and a data reproducing apparatus for receiving the plural pieces of recorded data and the clock signals from the data reading apparatus, and for reproducing, in accordance with the clock signals, original data from the plural pieces of recorded data, wherein the data reading apparatus interrupts the providing of the clock signals to the data reproducing apparatus based on the detection of a first synch-byte signal, the clock signals being interrupted from a time of completion of reading a first piece of the recorded data to a time of commencement of reading a second piece of the recorded data, as determined by detection of a second synch-byte signal.

16. The apparatus according to claim 15, wherein the data reading apparatus provides a predetermined bit pattern indicative of interruption to the data reproduction apparatus.

17. The apparatus according to claim 16, wherein said predetermined bit pattern comprises a pattern of all 0's.

18. The apparatus according to claim 15, wherein when any one of the synch-byte signals is not detected, the data reading apparatus restores the original data corresponding to the undetected synch-byte signal from the recorded data corresponding to another synch-byte signal.

19. The apparatus according to claim 15, wherein said control signal includes a preamble signal and a training signal.

20. An apparatus for reproducing original data from sector data recorded on a recording medium, the sector data including plural pieces of recorded data, synch-byte signals, control signals, and an ECC code signal, wherein each of the synch-byte and control signals corresponds to one of the plural pieces of recorded data, respectively, and each control signal is used for a read control, said method apparatus comprising:

a data reading apparatus for reading the sector data from the recording medium, generating an output clock signal, and detecting the synch-byte signals of the sector data; and a data reproducing apparatus for receiving the plural pieces of recorded data and the output clock signal from the data reading apparatus, and for reproducing, in accordance with the output clock signal, original data from the plural pieces of recorded data of the sector data, wherein the data reading apparatus interrupts the providing of the output clock signal to the data reproducing apparatus based on the detection of a first synch-byte signal, the output clock signal being interrupted from a time of completion of reading first piece of the recorded data to a time of commencement of reading a second piece of the recorded data, as determined by detection of a second synch-byte signal, and wherein when any one of the synch-byte signals is not detected, the data reading apparatus restores the original data corresponding to the undetected synch-byte signal from the recorded data corresponding to another synch-byte signal and the ECC code.

21. The apparatus according to claim 20, wherein the data reading apparatus provides a predetermined bit pattern indicative of interruption to the data reproduction apparatus.

22. The apparatus according to claim 21, wherein said predetermined bit pattern comprises a pattern of all 0's.

23. The apparatus according to claim 20, wherein said control signal includes a preamble signal and a training signal.

24. An apparatus for reproducing data from sector data recorded on a recording medium, the sector data including plural pieces of original data, synch-byte signals, and control signals, wherein each of the synch-byte signals, and control signals corresponds to a respective one of the plural pieces of original data, the apparatus comprising:

an analog to digital converter circuit for receiving sector data read from the recording medium and converting the read sector data from an analog signal to a serial digital circuit;

a synch-byte detector which receives the serial digital signal and detects the synch-byte signals therein;

a processor, connected to the synch-byte detector, for generating an output clock signal; and a data reproduction device coupled to the processor and the synch-byte detector, the data reproduction device for receiving the serial digital signal and the output clock signal and reproducing the plural pieces of original data from the serial digital signal in accordance with the output clock signal and reproducing the plural pieces of original data from the serial digital signal in accordance with the output clock signal, wherein the output clock is inhibited by the synch-byte detector for a time period after a first synch-byte is detected, beginning from completion of reading the piece of original data corresponding to the first synch-byte to commencement of reading the next piece of original data, as determined by detection of a second synch-byte signal.

25. The apparatus of claim 24 further comprising a serial to parallel converter coupled to the synch-byte detector for receiving the serial digital signal and converting the serial digital signal to a parallel digital signal, wherein the data reproduction device receives the parallel digital signal and reproduces the plural pieces of original data therefrom.

26. The apparatus of claim 25 further comprising a PLL connected to the analog to digital convertor, the PLL generating a signal CK for synchronizing operation of the analog to digital converter, the synch-byte detector, the serial to parallel converter, and the processor.

27. The apparatus of claim 25 wherein the analog to digital converter further comprises an amplifier and a filter, wherein the read sector data is amplified and filtered by the amplifier and filter, respectively, prior to being converted from an analog signal to a digital signal.

28. The apparatus of claim 27 further comprising a demodulator connected between the analog to digital converter and the synch byte detector, the demodulator for demodulating the serial digital signal so that the synch byte detector receives a demodulated serial digital signal.

* * * * *

UNITED STATES PATENT AND TRADEMARK OFFICE
CERTIFICATE OF CORRECTION

PATENT NO.: 6,061,311
DATED : May 9, 2000
INVENTOR(S): Shigetaka ASANO, et al.

It is certified that an error appears in the above-identified patent and that said Letters Patent is hereby corrected as shown below:

Col. 11, line 42, after "reading" insert --a--.

Signed and Sealed this

Twentieth Day of March, 2001

Attest:

NICHOLAS P. GODICI

Attesting Officer     *Acting Director of the United States Patent and Trademark Office*